United States Patent
Lancaster et al.

(10) Patent No.: US 8,103,431 B2
(45) Date of Patent: Jan. 24, 2012

(54) ENGINE VACUUM ENHANCEMENT IN AN INTERNAL COMBUSTION ENGINE

(75) Inventors: David R. Lancaster, Troy, MI (US); Anthony Santana, Livonia, MI (US)

(73) Assignee: GM Global Technology Operations LLC

(*) Notice: Subject to any disclaimer, the term of this patent is extended or adjusted under 35 U.S.C. 154(b) by 682 days.

(21) Appl. No.: 12/234,888

(22) Filed: Sep. 22, 2008

(65) Prior Publication Data
US 2009/0187328 A1 Jul. 23, 2009

Related U.S. Application Data

(60) Provisional application No. 61/022,934, filed on Jan. 23, 2008.

(51) Int. Cl.
*F02P 5/06* (2006.01)

(52) U.S. Cl. ........ 701/110; 701/111; 123/327; 123/399; 123/406.24; 123/406.52

(58) Field of Classification Search .......... 701/103, 701/110, 111; 123/399, 406.19, 406.23, 123/406.24, 406.49, 406.52, 406.67, 406.68, 123/327, 406.25, 406.58
See application file for complete search history.

(56) References Cited

U.S. PATENT DOCUMENTS

| | | | | |
|---|---|---|---|---|
| 4,033,272 A * | 7/1977 | Henrich | ............. | 123/406.53 |
| 4,211,119 A * | 7/1980 | Wolber | ............. | 73/721 |
| 4,242,996 A * | 1/1981 | Urbansky | ............. | 123/406.67 |
| 7,267,105 B1 * | 9/2007 | Chamblin | ............. | 123/406.59 |

FOREIGN PATENT DOCUMENTS
EP 0 456 616 * 11/1991
* cited by examiner

*Primary Examiner* — Hai Huynh

(57) ABSTRACT

A control system for an engine includes a manifold absolute pressure (MAP) module that compares MAP of an engine to a predetermined MAP and an air/spark module that decreases flow of air and that advances ignition spark when the MAP module indicates that the MAP is greater than a predetermined MAP.

25 Claims, 4 Drawing Sheets

ENGINE VACUUM ENHANCEMENT IN AN INTERNAL COMBUSTION ENGINE

CROSS-REFERENCE TO RELATED APPLICATIONS

This application claims the benefit of U.S. Provisional Application No. 61/022,934, filed on Jan. 23, 2008. The disclosure of the above application is incorporated herein by reference.

FIELD

The present disclosure relates to varying throttle angle and spark advance to control a vacuum level in an internal combustion engine while maintaining engine output torque.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include power brakes with a brake booster. The brake booster amplifies brake pedal effort and applies the amplified effort to a master cylinder of a brake hydraulic system. The brake booster is powered by vacuum from the engine.

In addition to the brake booster, some vehicles also include a catalyst that treats an exhaust gas stream. Engine airflow requirements for warming the catalyst can reduce the vacuum that is available to the brake booster. When cold starting the engine, an engine control system may retard an ignition angle of the engine to increase the exhaust gas temperature. The increased exhaust gas temperature reduces the time needed for warming the catalyst to a catalyst light-off temperature. While the ignition angle is retarded, the engine control system may also increase the throttle opening to compensate for engine torque that is lost due to the retarded spark angle. The open throttle reduces the amount of vacuum and consequently reduces the amount of brake boost that is available from the brake boost assembly. This situation may increase braking effort for the driver while the catalyst is being warmed.

SUMMARY

A control system for an engine includes a manifold absolute pressure (MAP) module that compares MAP of an engine to a predetermined MAP and an air/spark module that decreases flow of air and that advances ignition spark when the MAP module indicates that the MAP is greater than a predetermined MAP.

In other features a brake booster is powered by a vacuum of the engine. The air/spark module adjusts the flow of air and the ignition spark to increase an exhaust temperature prior to responding to the MAP being greater than the predetermined MAP. The air/spark module decreases the flow of air and advances the ignition spark such that an output torque of the engine remains unchanged. A MAP sensor generates a signal based on the MAP and communicates the signal to the MAP module. The air/spark module estimates the MAP based on the throttle opening and a speed of the engine.

A control system for an engine includes a manifold absolute pressure (MAP) module that determines whether a MAP of an engine is greater than a predetermined MAP and an air/spark module that adjusts the flow of air and the ignition angle to increase an exhaust temperature and that interrupts increasing the exhaust temperature to momentarily advance the ignition spark and momentarily decrease the flow of air.

In other features the air/spark module interrupts based on the MAP. The air/spark module includes a timer module that indicates an elapsed time that the air/spark module increased the exhaust temperature. The air/spark module interrupts increasing the exhaust temperature based on the elapsed time. A brake booster is powered by a vacuum of the engine. The air/spark module decreases the flow of air and advances the ignition angle such that an output torque of the engine remains unchanged. A MAP sensor generates a signal based on the MAP and communicates the signal to the MAP module. The air/spark module estimates the MAP based on the throttle opening and a speed of the engine.

A method of controlling an engine includes determining whether a MAP of an engine is greater than a predetermined MAP and, decreasing the flow of air and advancing the ignition spark when the determining step determines that the MAP is greater than the predetermined MAP.

In other features the method includes powering a brake booster with vacuum of the engine. The method includes adjusting the flow of air and the ignition spark to increase an exhaust temperature prior to decreasing the flow of air and advancing the ignition spark. The method includes decreasing the flow of air and advancing the ignition spark such that an output torque of the engine remains unchanged. The method includes generating a signal based on the MAP and employing the signal in the determining step. The method includes estimating the MAP based on the throttle opening and a speed of the engine.

A method for controlling an engine includes determining whether a MAP of an engine is greater than a predetermined MAP, adjusting the flow of air and the ignition spark to increase an exhaust temperature, and interrupting the adjusting step to momentarily advance the ignition spark and momentarily decrease the flow of air.

In other features the interrupting is based on the determining step. The method includes indicating an elapsed time of the adjusting step and interrupting the adjusting step based on the elapsed time. The method includes powering a brake booster with vacuum of the engine. Decreasing the flow of air and advancing the ignition angle are performed such that an output torque of the engine remains unchanged. The method includes generating a signal based on the MAP and employing the signal in the determining step.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
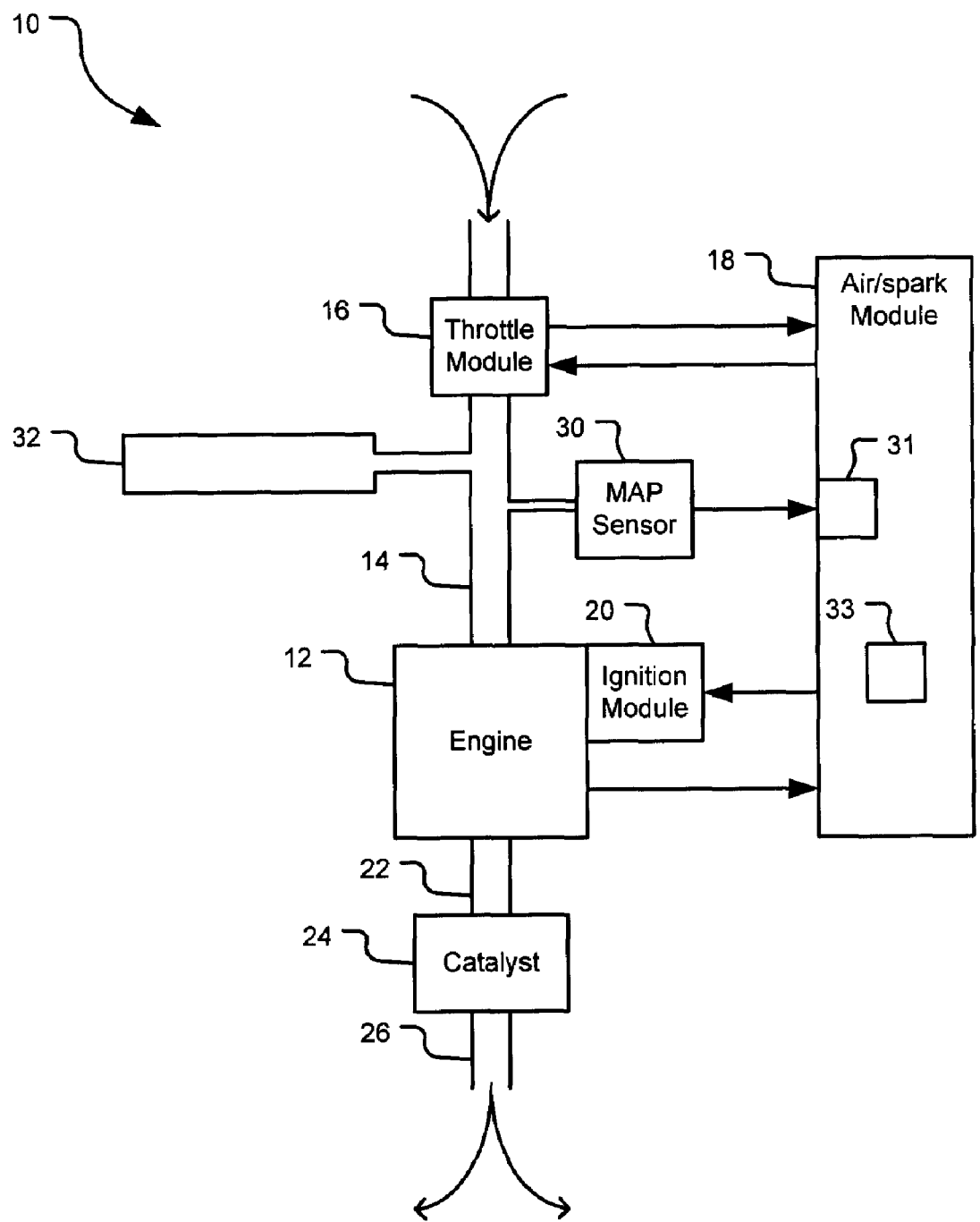
FIG. 1 is a functional block diagram of a vehicle engine and associated components.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram is shown of an engine system 10. An engine 12 receives intake air through an intake manifold 14. A throttle module 16 throttles the airflow based on a throttle position command from a control module 18. Throttle module 16 also communicates a throttle position signal to control module 18. The throttle position signal indicates an opening angle of a butterfly valve that is included in throttle module 16. An ignition module 20 delivers an ignition spark to engine 12. The ignition spark occurs at a spark advance or ignition angle that is specified by control module 18. Engine 12 generates exhaust gas that flows through an exhaust pipe 22 and a catalyst 24. The exhaust gas exits catalyst 24 and then flows to the atmosphere via a tail pipe 26.

Engine control system 10 can include a manifold absolute pressure (MAP) sensor 30. MAP sensor 30 generates a signal that indicates the absolute air pressure inside intake manifold 14. MAP sensor 30 communicates the signal to control module 18. The manifold vacuum can be estimated as a difference between the barometric or atmospheric pressure and the MAP. Control module 18 includes a MAP comparator module 31 that receives the signal and indicates whether the MAP is greater than a predetermined MAP limit, e.g. during low vacuum. A brake booster 32 is powered by the vacuum of intake manifold 14. In some embodiments control module 18 can estimate MAP and/or vacuum based on the engine speed and throttle position as is known in the art.

When engine 12 is cold started, catalyst 24 is also cold and does not catalyze the exhaust gas. For catalyst 24 to be effective, its temperature must be raised to a catalyst light off temperature. Control module 18 therefore retards the ignition angle to increase the exhaust gas temperature and quickly heat catalyst 24. Since a retarded spark angle reduces engine torque, control module 18 increases the throttle opening of throttle module 16 to compensate for the reduced torque.

The increased throttle opening reduces the amount of vacuum in manifold 14 and the amount of vacuum that is available to power brake booster 32. To restore the vacuum level and recharge brake booster 32, control module 18 momentarily interrupts warming up the catalyst. During the interruption, control module 18 reduces the throttle angle in throttle module 16 and advances the spark angle via ignition module 20. The new throttle opening and spark angle settings are chosen such that engine 12 produces the same amount of torque as when the spark angle is retarded to increase the exhaust gas temperature. In some embodiments the engine torque can be considered to be the same when the engine torque varies less than 5 Nm under load and/or the engine speed varies less than 50 RPM at idle. The reduced throttle angle increases the vacuum in manifold 14 and thereby restores vacuum for powering brake booster 32. Once brake booster 32 is recharged with vacuum, control module 18 resumes retarding the spark angle and opening the throttle to heat catalyst 24. Control module 18 includes a timer module 33 that indicates when to start and/or stop restoring the vacuum for brake booster 32.

Figure 2:
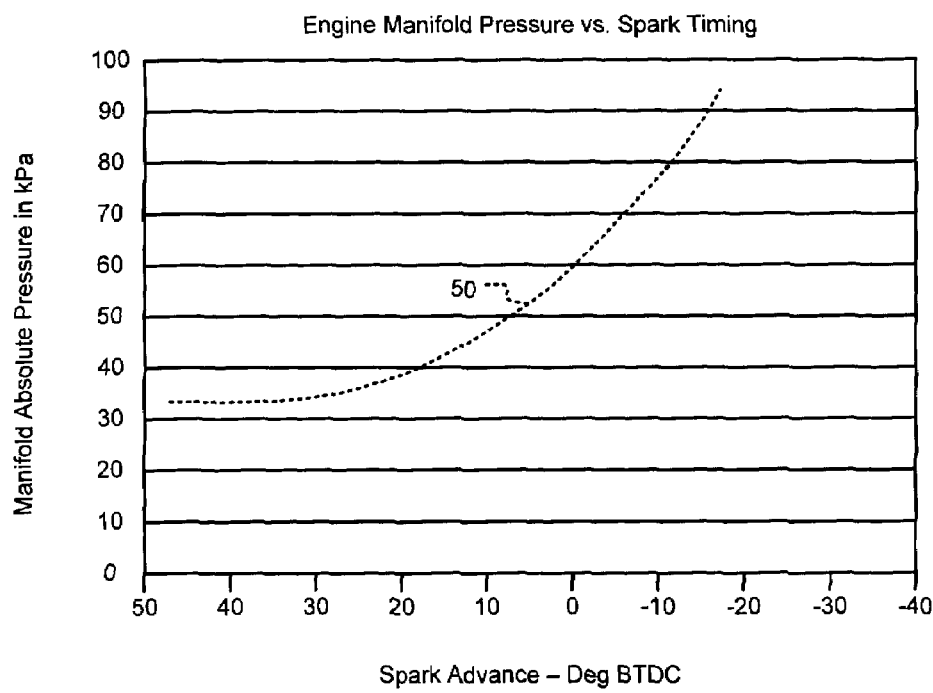
FIG. 2 is a graph of manifold absolute pressure versus spark advance for a given engine output torque.

Referring now FIG. 2, a graph includes a vertical axis that indicates MAP and a horizontal axis that indicates spark advance. Since MAP and vacuum are related, MAP can be used to indicate vacuum. The spark advance is shown in degrees before top dead center (BTDC). The positive values on the horizontal axis therefore indicate degrees BTDC and the negative values indicate degrees after top dead center. A curve 50 plots an example of combinations of MAP and spark advance that are associated with a constant engine output torque. Curve 50 shows that, for a given amount of torque, retarding the spark requires more air flow through throttle 16 and reduces the engine vacuum. Conversely, for the same amount of torque, advancing the spark requires less air flow through throttle 16 and increases the engine vacuum.

Figure 3:
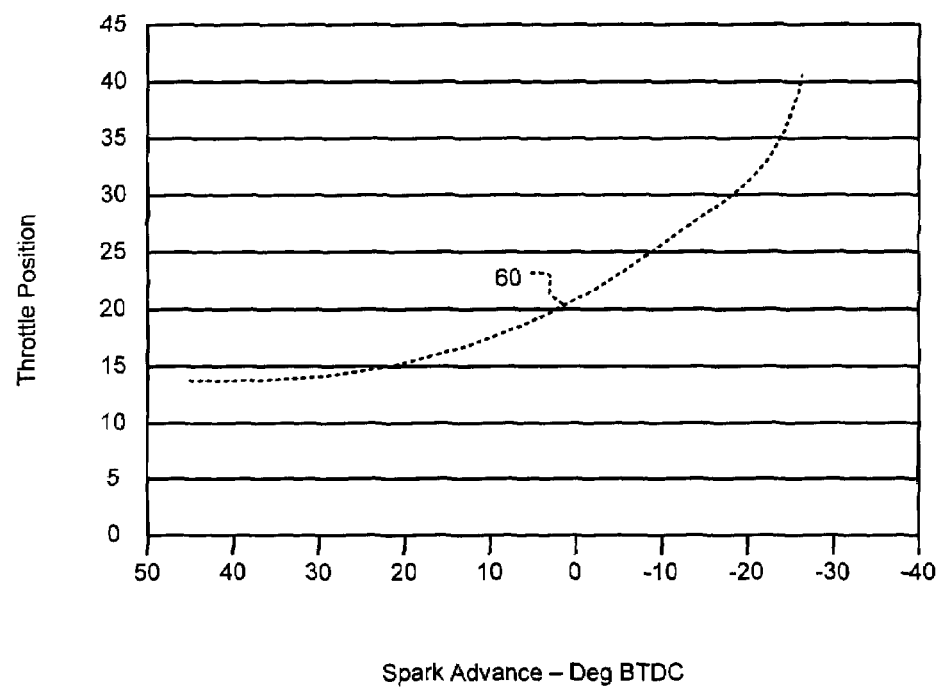
FIG. 3 is a graph of throttle position versus spark advance for a given engine output torque.

Referring now FIG. 3, a graph includes a vertical axis that indicates the throttle angle and a horizontal axis that indicates the spark advance. A curve 60 plots combinations of throttle angle and spark advance that are associated with a constant engine output torque. Curve 60 shows that, for a given amount of torque, retarding the spark requires increasing the throttle opening, and which reduces the engine vacuum. Conversely, for the same amount of torque, advancing the spark requires decreasing the throttle opening, which increases the engine vacuum.

Figure 4:
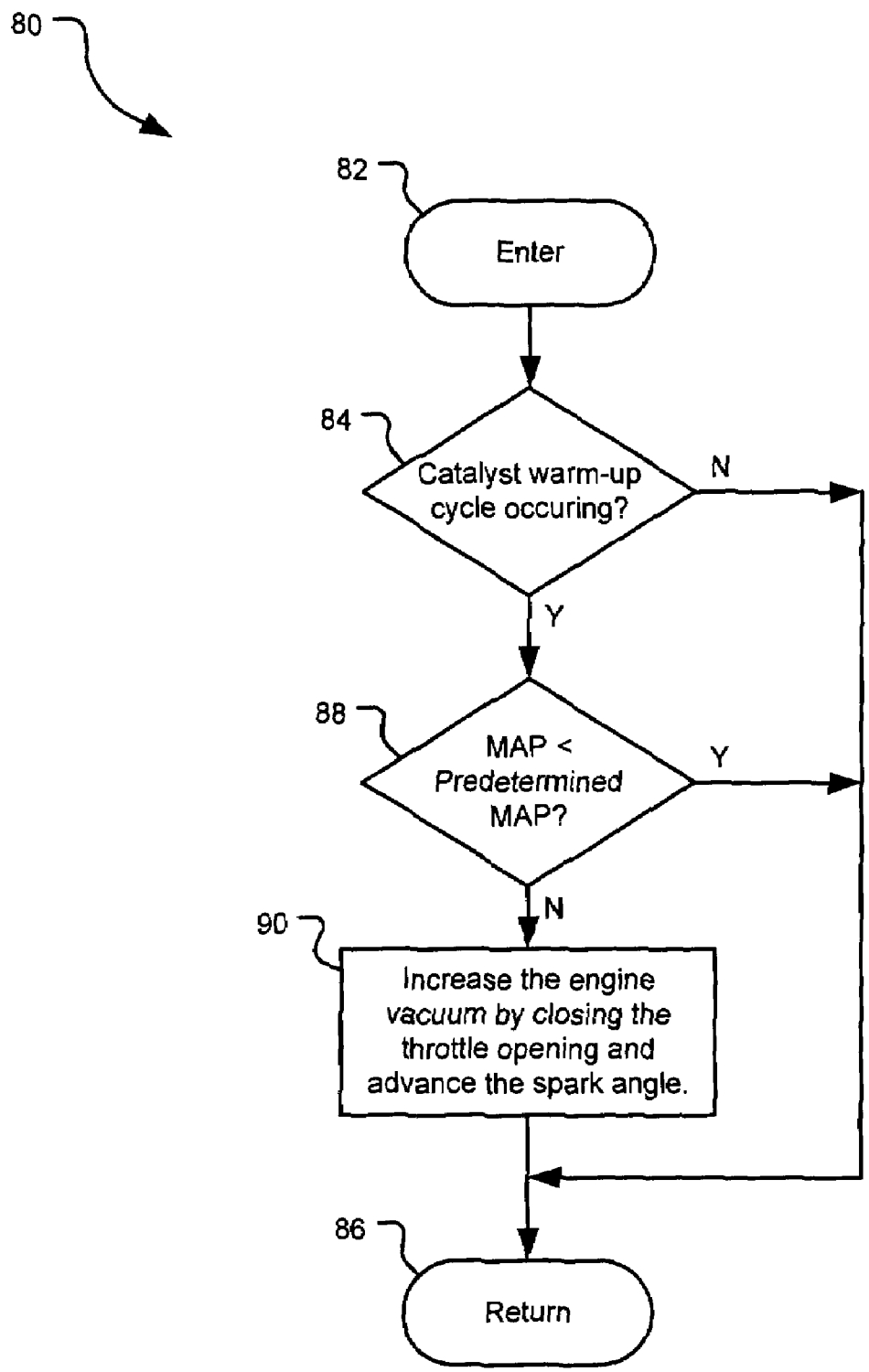
FIG. 4 is a flow chart of a method to restore engine vacuum that is lost while the catalyst is warming up.

FIG. 4 depicts a method 80 that restores manifold vacuum that can be used by power brake booster 32. Method 80 executes while control module 18 is warming catalyst 24 after a cold start. Control module 18 can execute method 80.

Control enters at block 82 and proceeds to decision block 84. In decision block 84 control determines whether control module 18 is warming catalyst 24. If it is not, then control exits via return block 86 without adjusting the spark angle and/or throttle angle to restore vacuum for brake booster 32. If, in decision block 84, control determines that control module 18 is warming catalyst 24 then control branches to decision block 88. In decision block 88 control employs MAP comparator module 31 to determine whether the MAP is less than the predetermined MAP. If the MAP is less than the predetermined MAP then control exits via return block 86. On the other hand, if the MAP is greater than predetermined MAP then control branches to block 90. In block 90, control interrupts the catalyst warming process and momentarily increases the manifold vacuum for brake booster 32. Control increases the manifold vacuum by reducing the throttle opening and advancing the spark angle. The duration of the momentary vacuum increase can be chosen based on a time constant of brake booster 32. In some embodiments a duration of one second is sufficient. Control selects the new throttle position and spark angle so that engine 12 produces the same torque during block 90 as when the catalyst was being warmed. Upon leaving block 90 control resumes setting the spark angle and throttle angle to warm the catalyst.

Figure 5:
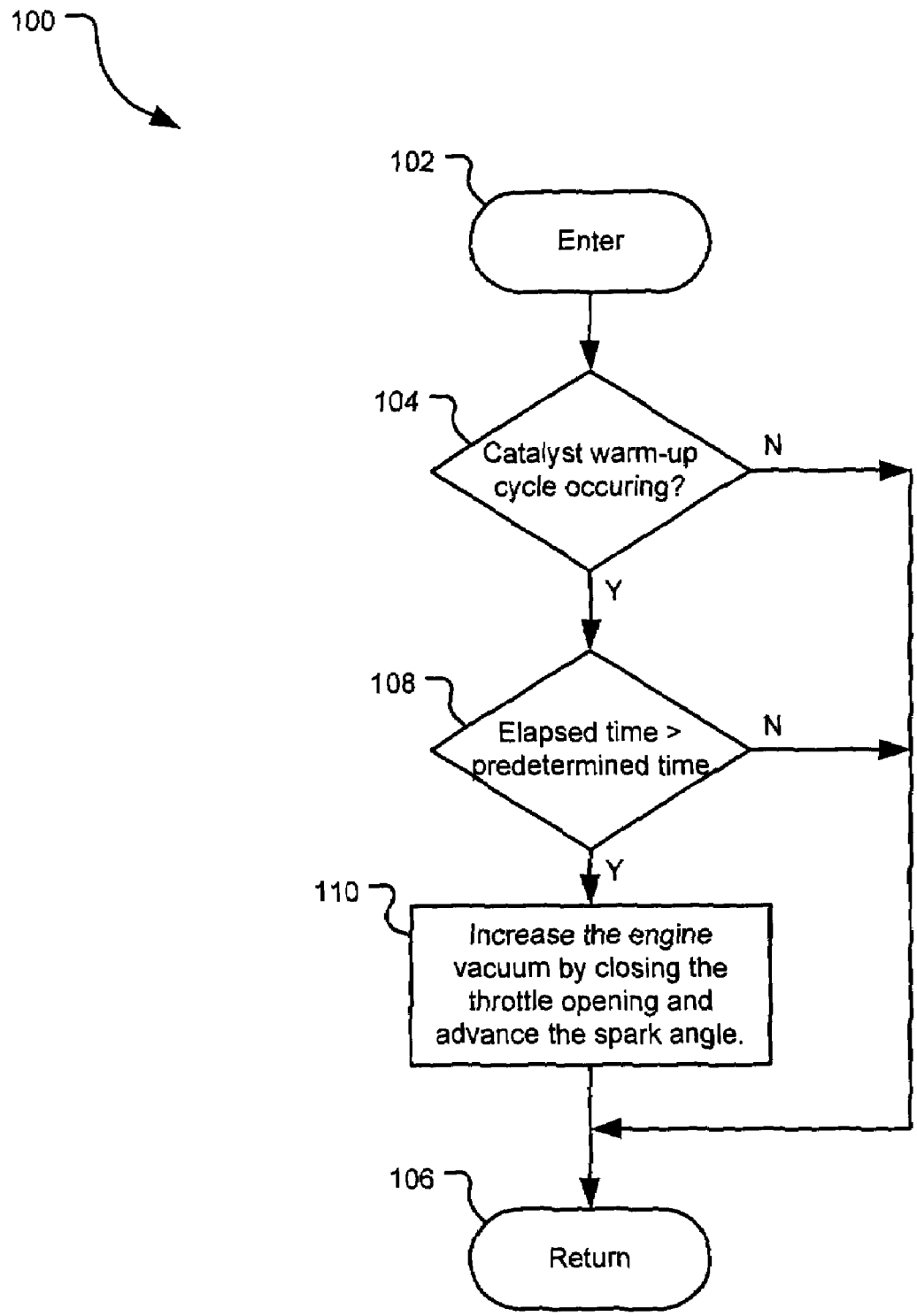
FIG. 5 is a flow chart of a second method to restore engine vacuum that is lost while the catalyst is warming up.

Referring now to FIG. 5 a second method 100 is shown for restoring the amount of vacuum in intake manifold 14 while control module 18 is warming catalyst 24. Control enters via block 102 and immediate proceeds to decision block 104. In decision block 104 control determines whether control module 18 is warming catalyst 24. If it is not, then control exits via return block 106. On the other hand, if control module 18 is warming catalyst 24 then control branches to decision block 108. In decision block 108 control determines whether control module 18 has been warming catalyst 24 for longer than a predetermined time. If not, then control branches from decision block 108 to return block 106. On the other hand, if control module 18 has been warming catalyst 24 for longer than the predetermined time, then control branches to block 110. In block 110, control interrupts the catalyst warming process and momentarily increases the manifold vacuum for brake booster 32. Control increases the manifold vacuum by reducing the throttle opening and advancing the spark angle. The duration of the momentary vacuum increase can be chosen based on a time constant of brake booster 32. In some embodiments a duration of one second is sufficient. Control selects the new throttle position and spark angle so that engine 12 produces the same torque during block 110 as when the catalyst was being warmed. Upon leaving block 110 control resumes setting the spark angle and throttle angle to warm the catalyst.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
   a brake booster that is powered based on a manifold absolute pressure (MAP) of the engine and that selectively increases a force applied to brakes of a vehicle;
   a MAP module that compares the MAP of the engine to a predetermined MAP, wherein the predetermined MAP is a maximum MAP for operating the brake booster; and
   an air/spark module that decreases the MAP of the engine by decreasing a flow of air into the engine and that advances ignition spark when the MAP module indicates that the MAP is greater than the predetermined MAP.

2. The system of claim 1 wherein the air/spark module adjusts the flow of air and the ignition spark to increase an exhaust temperature of the engine prior to decreasing the flow of air and advancing ignition spark to decrease the MAP of the engine.

3. The system of claim 1 wherein the air/spark module decreases the flow of air and advances the ignition spark such that an output torque of the engine varies less than 5 Nm or a speed of the engine varies less than 50 revolutions per minute.

4. The system of claim 1 further comprising a MAP sensor that generates a signal based on the MAP and that communicates the signal to the MAP module.

5. The system of claim 1 wherein the air/spark module estimates the MAP based on the throttle opening and a speed of the engine.

6. The control system of claim 1, wherein the air/spark module commands the flow of air into the engine and the ignition spark to desired levels when the MAP decreases to a second predetermined MAP, wherein the second predetermined MAP is a desired MAP for operating the brake booster.

7. A control system for an engine, comprising:
   a brake booster that is powered based on a manifold absolute pressure (MAP) of the engine and that selectively increases a force applied to brakes of a vehicle;
   a MAP module that determines whether the MAP of the engine is greater than a predetermined MAP, wherein the predetermined MAP is a maximum MAP for operating the brake booster; and
   an air/spark module that adjusts a flow of air into the engine and ignition spark to increase an exhaust temperature of the engine, and that interrupts increasing the exhaust temperature to momentarily advance ignition spark and momentarily decrease the flow of air to decrease the MAP of the engine.

8. The system of claim 7 wherein the air/spark module interrupts increasing the exhaust temperature when the MAP is greater than the predetermined MAP.

9. The system of claim 7 wherein the air/spark module includes a timer module that indicates an elapsed time that the air/spark module has been increasing the exhaust temperature and wherein the air/spark module interrupts increasing the exhaust temperature based on the elapsed time.

10. The system of claim 7 wherein the air/spark module decreases the flow of air and advances the ignition spark such that an output torque of the engine varies less than 5 Nm or a speed of the engine varies less than 50 revolutions per minute.

11. The system of claim 7 further comprising a MAP sensor that generates a signal based on the MAP and that communicates the signal to the MAP module.

12. The system of claim 7 wherein the air/spark module estimates the MAP based on throttle opening and a speed of the engine.

13. The control system of claim 7, wherein the air/spark module commands the flow of air into the engine and the ignition spark to desired levels when the MAP decreases to a second predetermined MAP, wherein the second predetermined MAP is a desired MAP for operating the brake booster.

14. A method of controlling an engine, comprising:
   powering a brake booster based on a manifold absolute pressure (MAP) of the engine, wherein the brake booster selectively increases a force applied to brakes of a vehicle;
   determining whether the MAP of the engine is greater than a predetermined MAP, wherein the predetermined MAP is a maximum MAP for operating the brake booster; and
   decreasing the MAP by decreasing a flow of air into the engine and advancing ignition spark when the MAP is greater than the predetermined MAP.

15. The method of claim 14 further comprising adjusting the flow of air and the ignition spark to increase an exhaust temperature of the engine prior to decreasing the flow of air and advancing the ignition spark to decrease the MAP of the engine.

16. The method of claim 14 further comprising decreasing the flow of air and advancing the ignition spark such that an output torque of the engine varies less than 5 Nm or a speed of the engine varies less than 50 revolutions per minute.

17. The method of claim 14 further comprising generating a signal based on the MAP and employing the signal in the determining.

18. The method of claim 14 further comprising estimating the MAP based on throttle opening and a speed of the engine.

19. The method of claim 14, further comprising commanding the flow of air into the engine and the ignition spark to desired levels when the MAP decreases to a second predetermined MAP, wherein the second predetermined MAP is a desired MAP for operating the brake booster.

20. A method for controlling an engine, comprising:
powering a brake booster based on manifold absolute pressure (MAP) of the engine, wherein the brake booster selectively increases a force applied to brakes of a vehicle;
determining whether the MAP of the engine is greater than a predetermined MAP, wherein the predetermined MAP is a maximum MAP for operating the brake booster;
adjusting a flow of air into the engine and ignition spark to increase an exhaust temperature of the engine; and
interrupting increasing the exhaust temperature to momentarily advance the ignition spark and momentarily decrease the flow of air to decrease the MAP.

21. The method of claim 20 wherein the interrupting is performed when the MAP is greater than the predetermined MAP.

22. The method of claim 20 further comprising indicating an elapsed time of the adjusting and interrupting the adjusting based on the elapsed time.

23. The method of claim 20 wherein decreasing the flow of air and advancing the ignition spark are performed such that an output torque of the engine varies less than 5 Nm or a speed of the engine varies less than 50 revolutions per minute.

24. The method of claim 20 further comprising generating a signal based on the MAP and employing the signal in the determining.

25. The method of claim 20, further comprising commanding the flow of air into the engine and the ignition spark to desired levels when the MAP decreases to a second predetermined MAP, wherein the second predetermined MAP is a desired MAP for operating the brake booster.

* * * * *